United States Patent [19]
Boretzky et al.

[11] Patent Number: 4,816,325
[45] Date of Patent: Mar. 28, 1989

[54] THERMALLY FLEXIBLE POLYURETHANE COATINGS FOR SUBSTRATES CONTAINING ARAMID FIBERS

[75] Inventors: Leon N. Boretzky, Pittsburgh; Mark J. Wytiaz, Sewickley, both of Pa.

[73] Assignee: Mobay Corporation, Pittsburgh, Pa.

[21] Appl. No.: 35,964

[22] Filed: Apr. 8, 1987

[51] Int. Cl.$^4$ .................. B32B 27/00; B32B 27/40; C08G 18/34; C08G 18/42

[52] U.S. Cl. .................. 428/423.1; 428/423.5; 528/80; 528/81; 528/83; 528/84

[58] Field of Search .................. 428/423.1, 423.5; 528/80, 81, 83, 84

[56] References Cited

U.S. PATENT DOCUMENTS

| | | | |
|---|---|---|---|
| 4,413,111 | 11/1983 | Markusch et al. | 528/80 X |
| 4,485,228 | 11/1984 | Chang et al. | 528/84 |
| 4,623,951 | 11/1986 | DuPont et al. | 428/423.1 |
| 4,639,471 | 1/1987 | Hirai et al. | 528/81 X |

*Primary Examiner*—Michael Lusignan
*Attorney, Agent, or Firm*—Gene Harsh; Joseph C. Gil; Thomas W. Roy

[57] ABSTRACT

The present invention is directed to a process for coating a substrate containing aramid fibers by coating the substrate with a two-component polyurethane-forming composition which cures to form a tough, flexible polyurethane coating which is capable of withstanding at least 3000 temperature cycles between a temperature of −65° F. and a temperature of 160° F. and back without developing microcracks. The present invention is also directed to the coated substrate produced in accordance with this process.

20 Claims, No Drawings

THERMALLY FLEXIBLE POLYURETHANE COATINGS FOR SUBSTRATES CONTAINING ARAMID FIBERS

BACKGROUND OF THE INVENTION

1. Field of the Invention

The present invention is directed to a process for applying a tough, flexible polyurethane coating to a substrate containing aramid fibers and to the coated substrate obtained by this process.

2. Description of the Prior Art

The use of composites as lightweight alternatives to steel has been steadily increasing in recent years. The strength-to-weight and rigidity-to-weight ratios of these composites are many times higher than those of steel. Skins of epoxy impregnated aramid fibers such as Kevlar aramid fibers available from DuPont are used to reinforce the composites, especially those having a honeycomb core such as Nomex honeycomb core, available from DuPont.

Prior to the use of these composites, they are generally coated in order to protect the composite from the enviroment in which it is used. Since the composites are extensively used in aircraft, severe requirements are placed upon the coatings. For example, the composites used in aircraft are subjected to repeated temperature cycles from as low as −65° F. to as high as 160° F. These repeated temperature fluctuations result in stresses to the the skin as well as the coating due to the different thermal and moisture expansion properties for the components of the skin, especially the aramid fibers.

Because the fibers expand at a different rate than the surrounding matrix, stresses are created during the repeated temperature changes resulting in microcracks in the aramid fiber-containing skin. Microcracks are also developed in the coating used on the skin if it cannot withstand these internal stresses. Further, once microcracks develop in both the skin and the coating, water can enter the honeycomb core through these microcracks and degrade the properties of the composite.

Accordingly, it is an object of the present invention to develop a coating for a substrate containing aramid fibers which can be used with composites such that the composites will be able to withstand repeated and wide variations in temperature without developing microcracks. The coating must also possess all of the other properties previously required of coatings of this type such as adhesion to the surface of the composite and solvent resistance. Surprisingly, these objectives may be achieved in accordance with the present invention discussed hereinafter.

SUMMARY OF THE INVENTION

The present invention is directed to a process for coating a substrate containing aramid fibers by coating the substrate with a two-component polyurethane-forming composition which cures to form a tough, flexible polyurethane coating which is capable of withstanding at least 3000 temperature cycles between a temperature of −65° F. and a temperature of 160° F. and back without developing microcracks.

The present invention is also directed to the coated substrate produced in accordance with this process.

DETAILED DESCRIPTION OF THE INVENTION

In order to prevent microcracking in coatings for substrates containing aramid fibers, it is necessary to provide a coating which possesses both flexibility and toughness. This may be achieved in accordance with the present invention by using a two-component coating composition containing:

(1) a polyisocyanate component having an average functionality of about 2.0 to 6.0 and based on one or more polyisocyanates and (2) a polyester polyol component containing one or more polyester polyols, the component having an average functionality of greater than about 2.5 and an average molecular weight of about 800 to 6000, wherein the component contains at least 15% by weight of cyclic groups and at least 15% by weight of linear $C_6$ or longer carbon chains, based on the weight of the polyol component.

Suitable organic polyisocyanates for use as the polyisocyanate component include monomeric polyisocyanates or polyisocyanate adducts prepared from monomeric polyisocyanates, preferably diisocyanates, and containing biuret, allophanate, urea, urethane or carbodiimide groups or isocyanurate rings. Suitable isocyanates and methods for preparing the polyisocyanate adducts are set forth in U.S. Pat. No. 4,439,593, herein incorporated by reference. The polyisocyanate adducts are preferably used to prepare the coatings, especially when the coatings are applied by spray application, due to their lower vapor pressure. However, monomeric polyisocyanates may be used in applications where workers will not be exposed to polyisocyanate vapors.

Preferred polyisocyanate adducts are biuret group-containing polyisocyanates based 1,6-diisocyanatohexane and polyisocyanate adducts containing isocyanurate groups and based on 2,4-diisocyanatotoluene and/or 2,6-diisocyanatotoluene, 1,6-diisocyanatohexane, 1-isocyanato-3,3,5-trimethyl-5-isocyanatomethyl-cyclohexane (isophorone diisocyanate or IPDI) and mixtures of these diisocyanates. Also preferred are polyisocyanates adducts containing urethane groups and based on trimethylol propane and 2,4-diisocyanatotoluene and/or 2,6-diisocyanatotoluene, 1,6-diisocyanatohexane, isophorone diisocyanate and mixtures of these diisocyanates. The most preferred polyisocyanate adducts are the biuret group-containing polyisocyanates based on 1,6-diisocyanatohexane, polyisocyanate adducts containing isocyanurate groups and based on 1,6-diisocyanatohexane and polyisocyanate adducts containing urethane groups and based on trimethylol propane and isomeric mixtures of diisocyanatotoluene. The former two most preferred polyisocyanate adducts are especially preferred when resistance to yellowing under the effect of ultraviolet light is required. Mixtures may also be used, especially mixtures of the biuret group-containing polyisocyanates based on 1,6-diisocyanatohexane and the polyisocyanate adducts containing isocyanurate groups and based on 1,6-diisocyanatohexane as set forth in copending application, U.S. Ser. No. 738,909, filed Dec. 8, 1986. The polyisocyanate component should have an average functionality of about 2 to 6, preferably about 2.5 to 4 and most preferably about 2.8 to 4.

The high molecular weight polyol component is based on one or more polyester polyols. The polyol component should have an average molecular weight of about 800 to 6000, preferably about 1000 to 4500, and should also have an average functionality of greater than about 2.5, preferably about 2.5 to 8 and most preferably about 2.5 to 6. Provided that the average molecular weight and functionality are within the above ranges, individual components of the mixture may have molecular weights and/or functionalities which are outside the above disclosed ranges.

The polyesters must possess both flexibility and toughness so that they can withstand the temperature fluctuations encountered when these coatings are applied to substrates containing aramid fibers, e.g., those encountered in aircraft applications. The coating must resist the different expansions in the substrate caused by the different thermal coefficients of expansion of the materials contained therein. It is possible to regulate the amount of flexibility and toughness imparted to the polyester polyol by varying the building blocks used to prepare this component.

Suitable polyesters for providing flexibility to the two-component coating are those which contain a six carbon ($C_6$) or longer chain, preferably a $C_6$ chain. The $C_6$ or longer chain may be a component of the polyol and/or the polyacid used to prepare the polyester. Another method for providing flexibility is the incorporation of linear polyols, i.e., those having a functionality of about 2, into the polyester mixture.

Suitable flexibilizing components for preparing the polyester polyol include adipic acid, suberic acid, azelaic acid, sebacic acid, hexane diol, octane diol, etc. The compounds having a $C_6$ chain are preferred to those having longer carbon chains since even though the latter chains provide flexibility, they do so at the expense of the toughness which is also required.

Suitable reactants for increasing the toughness of the polyester polyols are those which contain cyclic groups, i.e., aromatic or cycloaliphatic groups, and either hydroxyl groups or carboxylic acid groups (optionally in anhydride form or as esters of lower alcohols).

Suitable aromatic or cycloaliphatic carboxylic acids include phthalic acid, isophthalic acid, terephthalic acid, phthalic acid anhydride, tetrahydrophthalic acid anhydride, hexahydrophthalic acid anhydride, tetrachlorophthalic acid anhydride, endomethylene tetrahydrophthalic acid anhydride, tetrahydroisophthalic acid, hexahydroisophthalic acid, tetrahydrophthalic acid, hexahydrophthalic acid, tetrahydroterephthalic acid, hexahydrophthalic acid, dimethylterephthalate and bisglycolterephthalate. In the preparation of the polyester polyols it is possible to use the corresponding polycarboxylic acid anhydrides or polycarboxylic acids esters of lower alcohols instead of the free polycarboxylic acids.

Besides these polycarboxylic acids, it is also possible to provide toughness by using the corresponding polyols containing either aromatic or cycloaliphatic groups. The suitable polyols correspond to the polycarboxylic acids previously set forth with the exception that the carboxylic acid groups are replaced by hydroxyl groups.

In addition to the dicarboxylic acids previously described, it is also possible to use polyfunctional carboxylic acids such as trimellitic acid or trimellitic acid anhydride in order to provide branching in the polyester polyol. However, it is preferred to introduce branching through the polyol component used to prepare the polyester polyol. Suitable low molecular weight polyols having a functionality of at least 3 include trimethylol propane-(1,1,1), glycerol, hexanetriol-(1,2,6), butanetriol-(1,2,4), trimethylol ethane-(1,1,1), pentaerythritol, manitol, sorbitol, methyl glycoside, sucrose, and 1,1,2- or 1,1,1-tris-(hydroxyphenyl)-ethane.

Preferred reactants for introducing flexibility into the polyester polyols include hexane diol-(1,6) and adipic acid. Preferred reactants for introducing toughness into the polyester polyols include phthalic acid, phthalic acid anhydride, isophthalic acid, hexahydrophthalic acid anhydride and hexahydrophthalic acid for reasons of cost and performance. Otherwise, any of the aromatic or cycloaliphatic polycarboxylic acids previously described are suitable. The preferred compounds for introducing branching into the polyester polyol are glycerol and, especially, trimethylol propane-(1,1,1). It is also possible to use minor amounts of any of the known reactants for preparing polyester polyols. Suitable reactants of this type are set forth in U.S. Pat. Nos. 4,305,857 and 4,305,858, both herein incorporated by reference. In addition, low molecular weight diols and monoalcohols or monoacids may be blended with the reactants for forming the polyester polyols in order to achieve the desired functionality.

The functionality ($f_{OH}$) of the polyester polyol may be determined by the following formula $$f_{OH} = \frac{\Sigma \text{Equiv}_{OH} - \Sigma \text{Equiv}_{acid}}{\Sigma \text{Moles}_{OH} + \Sigma \text{Moles}_{acid} - \Sigma \text{Equiv}_{acid}}$$

For example, if two moles of a glycol (4 OH equivalents), two moles of a triol (6 OH equivalents) and three moles of a diacid (6 acid equivalents) are reacted to form a polyester polyol, than the theoretical average functionality is 4. When a monofunctional acid is used to reduce the functionality, the above formula may still be used. Thus, if one mole of a monocarboxylic acid (1 acid equivalent) is added to the above ingredients, the theoretical average functionality is 3. By varying the amounts and functionalities of the individual reactants, polyester polyols with virtually any theoretical average functionality may be obtained.

The reaction between the glycol and the acid is carried out under normal esterification conditions well known and described in the prior art: see for example Polyurethanes: Chemistry and Technology, Part I, pages 45–46, 1962, J. H. Saunder and K. C. Frisch, John Wiley & Sons, New York, N.Y. Illustratively, the esterification is conducted in the absence of solvent under a flow of nitrogen and a temperature of about 150° C. to 250° C., preferably about 190° C. to 225° C. for a period of about 4 to 40 hours, preferably about 6 to 24 hours. The reaction is terminated when the acid number of the product is less than 4, preferably less than about 2. Water of condensation which is removed as a by-product during the reaction may be removed by conducting the reaction by vacuum conditions.

While catalysts are not necessary, they may be employed to shorten the esterification process. Suitable catalysts include p-toluene-sulphonic acid, magnesium oxide, calcium oxide, antimony oxide, zinc oxide, lead oxide, magnesium acetate, calcium acetate, zinc acetate, lead acetate, sodium acetate, potassium acetate, sodium 2-ethylhexanoate, potassium 2-ethylhexanoate, various organic amines, sodium methoxide, potassium methoxide, sodium alkoxytitanates, tetraalkyl titanates, hydrated monobutyl tin oxide, stannous oxalate, stannous chloride dihydrate and the like.

The polyester polyols should have a linear carbon content (based on the weight of carbon in chains of $C_6$ or longer, e.g., MW of $C_6=72$, MW of $C_8=84$, etc.) of at least 15% by weight, preferably at least 20% by weight and most preferably at least 25% by weight, based on the weight of the polyester polyol. The polyester polyol should have a content of aromatic or cycloaliphatic groups (calculated as $C_6$, MW=72) of at least 15% by weight, preferably at least 18% by weight and most preferably 20% by weight, based on the weight of the polyester polyol component.

In addition to the polyisocyanate and polyol components, the two-component coating compositions may also contain the solvents, catalysts, pigments, dyes, levelling agents, and the like which are well known in the field of polyurethane chemistry.

Suitable solvents which may be added to the coating compositions to reduce their viscosity include the known polyurethane solvents such as toluene, xylene, butylacetate, ethylacetate, ethylene glycol monoethyl ether acetate, ethylene glycol monomethyl ether acetate, ethylene glycol monobutyl ether acetate, ethylene glycol monohexyl ether acetate, propylene glycol monomethyl ether acetate, diethylene glycol monoethyl ether acetate, diethylene glycol monobutyl ether acetate, methyl ethyl ketone, methyl isobutyl ketone, methyl amyl ketone, apolar hydrocarbon solvents such as hexane and heptane (provided they are mixed with polar solvents), aromatic solvents and also mixtures of these solvents.

Suitable polyurethane catalysts include those known in polyurethane chemistry such as tertiary amines, quaternary ammonium hydroxides, alkaline metal hydroxides, alkaline metal alcoholates, alkaline metal phenolates, and in particular organic tin compounds. The catalysts are generally used in a quantity of about 0.001 to 10% by weight, based on the quantity of polyester used according to the invention.

Coatings according to the invention may be applied by any of the known, conventional methods for applying two-component coatings such as roller, brush, or immersion, especially conventional spray gun or airless spray gun. The coatings are especially suited for substrates containing aramid fibers in the surface, especially films or skins. The matrix for the aramid fibers does not form a critical part of the invention and, thus, any matrix can be used for binding the aramid fibers; however, an epoxy matrix is generally used. Other matrices include polyimides, bismaleimides, triazines, phthalocyanines, polystyrylpyridines, polysulfones, polyetherether ketones, polyphenylene sulfides and polyurethanes. Finally, the aramid fibers may be mixed with other fibers such as carbon, boron, graphite, glass or metallic fibers and polymer fibers such as polyacrylonitrile or polyethylene fibers.

The invention is further illustrated but is not intended to be limited to the following examples in which all parts and percentages are by weight unless otherwise specified.

EXAMPLES

The following components were used in the Examples:

Polyisocyanate A—a biuret group-containing polyisocyanate based on 1,6-diisocyanatohexane and having an equivalent weight of 191, based on solids (available as Desmodur N 75 from Mobay Corporation).

Polyol A—a polyester polyol present as a 65% solids solution in propylene glycol monomethyl ether acetate, having a functionality of about 12 to 12.5 and prepared from
53.3 parts trimethylol propane
36.0 parts hexahydrophthalic acid anhydride
17.0 parts phthalic acid anhydride.

Polyol B—a polyester polyol present as an 90% solids solution in propylene glycol monomethyl ether acetate, having a functionality of about 3.1 and prepared from
34.6 parts hexandiol-(1,6)
9.8 parts trimethylol propane
30.43 parts isophthalic acid
5.4 parts phthalic acid anhydride
10.7 parts adipic acid.

Additive A—a 33% solution in a 1:1 mixture methyl ethyl ketone and propylene glycol monomethyl ether acetate of a cellulose acetate/butyrate flow aid (available as CAB-551-0.1 SEC from Eastman Chemical).

Additive B—a magnesium silicate filler (available as Talc 399 from Whittaker, Clark & Daniels).

Additive C—a microcrystalline silicate filler (available as Imsil A-10 from Illinois Product).

Additive D—a strontium chromate pigment (available as SY-176 from Wayne Pigments).

Catalyst A—a 1% solution in propylene glycol monomethyl ether acetate of dibutyltin dilaurate (available as T-12 from Air Products and Chemicals).

A pigmented polyol composition was prepared by dispersing, grinding and mixing the following:
19.6 parts Polyol A
56.7 parts Polyol B
6.0 parts Additive A
39.0 parts Additive B
65.0 parts Additive C
26.0 parts Additive D
8.8 parts toluene
8.8 parts butylacetate
35.3 parts propylene glycol monomethyl ether acetate
35.3 parts methyl ethyl ketone
30.0 parts methyl isobutyl ketone
6.0 parts Catalyst A.

The polyol composition had a solids content of about 58%. The polyol composition was blended with 50.6 parts of Polyisocyanate A and applied to a composite having a honeycomb core (Nomex honeycomb core available from DuPont) and a surface layer of a thin sheet of an epoxy matrix containing aramid fibers (Kevlar aramid fibers available from DuPont). A 2"×3" panel of the coated laminate was tested for its ability to withstand repeated temperature cycles. In the test the coated laminate panel was cycled between temperatures of −65° F. to 160° F. for periods of 8 minutes at each temperature (16 minute cycles) for 3000 cycles. At this time the coated laminate was inspected for microcracks by drawing 1" lines in ink on the panel and examining the panel under a 30× microscope for the presence of microcracks. Any crack that causes the ink to wick is counted as one crack. The test value for the number of microcracks was determined by dividing the total number of microcracks by the total number of lines. No microcracks were found after the test.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for coating a substrate containing aramid fibers which comprises coating said substrate with a two-component polyurethane-forming composition which cures to form a tough, flexible, polyurethane coating which is capable of withstanding at least 3,000 temperature cycles between a temperature of $-65°$ F. and a temperature of $160°$ F. and back without developing microcracks, said polyurethane composition comprising
   (1) a polyisocyanate component having an average functionality of about 2.0 to 6.0 and based on one or more polyisocyanates and
   (2) a polyester polyol component comprising one or more polyester polyols, said component having an average functionality of greater than about 2.5 and an average molecular weight of about 800 to 6,000, wherein said component contains at least 15% by weight of cyclic groups and at least 15% by weight of linear $C_6$ or longer carbon chains, based on the weight of said polyester polyol component.

2. The process of claim 1 wherein said two-component polyurethane forming composition additionally comprises a pigment.

3. The process of claim 1 wherein said polyester polyol component is based on at least 15% by weight of linear $C_6$ carbon chains.

4. The process of claim 3 wherein said linear $C_6$ carbon chains are incorporated by a compound comprising a member selected from the group consisting of hexane diol and adipic acid.

5. The process of claim 1 wherein said polyisocyanate component has an average functionality of about 2.5 to 4.0 and comprises a biuret group-containing polyisocyanate prepared from 1,6-diisocyanatohexane.

6. The process of claim 1 wherein said polyester polyol component comprises a mixture of at least two polyester polyols.

7. The process of claim 1 wherein said cyclic groups are incorporated by one or more compounds comprising a member selected from the group consisting of phthalic acid, phthalic acid anhydride, isophthalic acid, hexahydrophthalic acid anhydride and hexahydrophthalic acid.

8. A process for coating a substrate containing aramid fibers which comprises coating said substrate with a pigmented, two-component polyurethane-forming composition which cures to form a tough, flexible polyurethane coating which is capable of withstanding at least 3000 temperature fluctuations between a temperature of $-65°$ F. and a temperature of $160°$ F. and back without developing microcracks, said polyurethane-forming composition comprising
   (1) a polyisocyanate component having an average functionality of about 2.5 to 4.0 and based on one or more polyisocyanates and
   (2) a polyester polyol component comprising one or more polyester polyols, said component having an average functionality of greater than about 2.5 and an average molecular weight of about 800 to 6000, wherein said component contains at least 18% by weight of cyclic groups and at least 20% by weight of linear $C_6$ carbon chains, based on the weight of said polyester polyol component.

9. The process of claim 8 wherein said linear $C_6$ carbon chains are incorporated by a compound comprising a member selected from the group consisting of hexane diol and adipic acid and said cyclic groups are incorporated by one or more compounds comprising a member selected from the group consisting of phthalic acid, phthalic acid anhydride, isophthalic acid, hexahydrophthalic acid anhydride and hexahydrophthalic acid.

10. The process of claim 9 wherein said polyisocyanate component comprises a biuret group-containing polyisocyanate prepared from 1,6-diisocyanatohexane.

11. A coated substrate, said substrate containing aramid fibers, which is prepared by coating said substrate with a two-component polyurethane-forming composition which cures to form a tough, flexible polyurethane coating which is capable of withstanding at least 3,000 temperature cycles between a temperature of $-65°$ F. and a temperature of $160°$ F. and back without developing microcracks, said polyurethane-forming composition comprising
   (1) a polyisocyanate component having an average functionality of about 2.0 to 6.0 and based on one or more polyisocyanates and
   (2) a polyester polyol component comprising one or more polyester polyols, said component having an average functionality of greater than about 2.5 and an average molecular weight of about 800 to 6,000, wherein said component contains at least 15% by weight of cyclic groups and at least 15% by weight of linear $C_6$ or longer carbon chains, based on the weight of said polyester polyol component.

12. The coated substrate of claim 11 wherein said cyclic groups are incorporated by one or more compounds comprising a member selected from the group consisting of phthalic acid, phthalic acid anhydride, isophthalic acid, hexahydrophthalic acid anhydride and hexahydrophthalic acid.

13. The coated substrate of claim 11 wherein said two-component polyurethane-forming composition additionally comprises a pigment.

14. The coated substrate of claim 11 wherein said polyester polyol component is based on at least 15% by weight of linear $C_6$ carbon chains.

15. The coated substrate of claim 14 wherein said linear $C_6$ carbon chains are incorporated by a compound comprising a member selected from the group consisting of hexane diol and adipic acid.

16. The coated substrate of claim 11 wherein said polyisocyanate component has an average functionality of about 2.5 to 4.0 and comprises a biuret group-containing polyisocyanate prepared from 1,6-diisocyanatohexane.

17. The coated substrate of claim 11 wherein said polyester polyol component comprises a mixture of at least two polyester polyols.

18. A coated substrate, said substrate containing aramid fibers, which is prepared by coating said substrate with a pigmented, two-component polyurethane-forming composition which cures to form a tough, flexible polyurethane coating which is capable of withstanding at least 3000 temperature fluctuations between a temperature of $-65°$ F. and a temperature of $160°$ F. and back without developing microcracks, said polyurethane-forming composition comprising
   (1) a polyisocyanate having an average functionality of about 2.5 to 4.0 and based on one or more polyisocyanates and (2) a polyester polyol component comprising one or more polyester polyols, said component having an average functionality of greater than about 2.5 and an average molecular weight of about 800 to 6000, wherein said component contains at least 18% by weight of cyclic groups and at least 20% by weight of linear $C_6$ carbon chains, based on the weight of said polyester polyol component.

19. The coated sustrate of claim 18 wherein said linear $C_6$ carbon chains are incorporated by a compound comprising a member selected from the group consisting of hexane diol and adipic acid and said cyclic groups are incorporated by one or more compounds comprising a member selected from the group consisting of phthalic acid, phthalic acid anhydride, isophthalic acid, hexahydrophthalic acid anhydride and hexahydrophthalic acid.

20. The coated substrate of claim 19 wherein said polyisocyanate component comprises a biuret group-containing polyisocyanate prepared from 1,6-diisocyanatohexane.

* * * * *